Patented Sept. 13, 1932

1,877,304

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

CARBONATES OF SALICYLIC ESTERS AND METHOD OF MAKING SAME

No Drawing.  Application filed June 13, 1929.  Serial No. 370,728.

The subject matter of this invention concerns methods for the preparation of carbonates of salicylic acid esters, together with certain new compounds of said type possessing properties of value for medicinal purposes.

The usual method employed for preparing the carbonates of organic hydroxy compounds consists in treating an alkali metal salt of the hydroxy compound in aqueous solution with phosgene, COCl$_2$, as described in German patent No. 58,129. However, it has been found that, although the aforementioned method works very well for preparing the carbonates of the phenols, for example, it is not equally satisfactory when applied to a salicylic ester or similar compound, apparently due to hydrolysis of the alkali metal salt of such salicylic ester in the presence of a relatively large amount of water. When the product of the reaction between a salicylic ester and phosgene in an aqueous medium is worked up, the ester is recovered in nearly the original amount and an almost negligible yield of the carbonate is realized. By replacing water with alcohol as solvent somewhat better yields are obtained, but still at best they are far from satisfactory.

I have now discovered an improved mode of procedure whereby a substantially complete conversion of a salicylic acid ester to the corresponding carbonate may be achieved. By means of my improved method certain new salicylic ester carbonates have been prepared and isolated, and properties thereof have been determined whereby such derivatives may be identified.

To the accomplishment of the foregoing and related ends, the invention, then, consists of the steps and new products hereinafter fully described and particularly pointed out in the claims, the following description setting forth in detail certain procedure suitable for the preparation of such new products, such disclosed steps constituting, however, but a few of the ways in which the principle of the invention may be used.

I have found that acetone may be used with notably advantageous results as solvent for the reacting materials in preparing the carbonates of salicylic esters. When a concentrated caustic alkali solution and phosgene are simultaneously introduced into the acetone solution of a salicylic acid ester, the reaction proceeds smoothly and expeditiously in the desired direction with a substantially complete conversion of the ester to the corresponding carbonate. The reaction takes place in accordance with the following equation, wherein R represents either an alkyl or aryl radical:

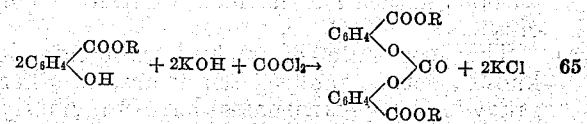

The advantage of using acetone as solvent is believed to lie in that it dissolves both the salicylic ester and its alkali metal salt, and facilitates the reaction of phosgene therewith, when the latter is introduced, without bringing about a reversion of the reaction by hydrolysis or alcoholysis, such as apparently takes place when water or alcohol is used as the medium for the reaction. The use of acetone as solvent, in any case, leads to a so greatly increased yield of desired product as to constitute a distinct advance in the art and makes possible the preparation of compounds of the present type on a commercial scale.

By way of illustration the following specific examples are given, but it is understood that the invention is not limited thereto.

Example 1

180 parts (1 mole) normal propyl salicylate are dissolved in about 500 parts acetone. With cooling and continuous stirring a concentrated aqueous solution containing 63 parts (1⅛ mole) caustic potash is slowly added from a dropping funnel, while at the same time a current of phosgene is passed into the reaction mixture. When all of the alkali has been added and the solution becomes neutral the supply of phosgene is shut off. The reaction mixture is then diluted with an equal volume of ice water and stirring is continued for a time until the solid carbonate separates completely. The product is then filtered off, washed with water, and recrystallized from alcohol. The purified product is the normal propyl salicylic ester carbonate, forming colorless, odorless crystals, insoluble in water, and nearly insoluble in cold alcohol. M. P. 61–62° C.

Example 2

166 parts (1 mole) ethyl salicylate are dissolved in acetone and treated with 45 parts (1⅛ mole) caustic soda according to the same procedure as in Example 1. The product is the ethyl salicylic ester carbonate, colorless, odorless crystals, insoluble in water and nearly so in cold alcohol. M. P. 95–96° C.

In each of the above examples an almost quantitative yield of salicylic ester carbonate is obtained. Only a very small amount of unreacted salicylic ester is found in the reaction product, such unreacted portion remaining dissolved in the alcohol solution from which the carbonate is recrstallized, and being readily recovered therefrom.

The salicylic ester carbonates possess useful medicinal properties. Being odorless and practically tasteless, they are especially suitable for administering salicylates internally without unpleasant, harmful or irritant by-effects.

The carbonate of methyl salicylate is known, but, so far as I am aware, no other salicylic ester carbonates have previously been prepared, isolated or identified as definite compounds. Accordingly, with exception of methyl salicylic ester carbonate, the herein described carbonates of salicylic esters constitute a new class of useful compounds.

Other modes of applying the principle of my invention may be employed instead of the one explained, change being made as regards the method and materials employed, provided the steps and ingredients stated by any of the following claims or the equivalent of such stated steps or ingredients be employed.

I, therefore, particularly point out and distinctly claim as my invention:—

1. The method of making a salicylic ester carbonate which comprises reacting between the corresponding ester, phosgene and an alkali in an acetone medium.

2. The method of making a salicylic ester carbonate which comprises reacting between the corresponding ester and slightly more than the equivalent proportion of phosgene and an alkali, respectively, in an acetone medium.

3. The method of making a salicylic ester carbonate which comprises reacting between an alkyl ester of salicylic acid, phosgene and an alkali in an acetone medium.

4. The method of making a salicylic ester carbonate which comprises reacting between an alkyl ester of salicylic acid and slightly more than the equivalent proportion of phosgene and an alkali, respectively, in an acetone medium.

5. The method of making a salicylic ester carbonate which comprises reacting between ethyl salicylate, phosgene and an alkali in an acetone medium.

6. The method of making a salicylic ester carbonate which comprises reacting between ethyl salicylate and slightly more than the equivalent proportion of phosgene and an alkali, respectively, in an acetone medium.

7. The method of making a carbonate of a salicylic acid ester, having the following formula:

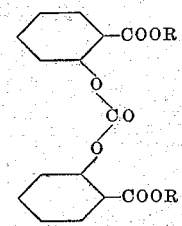

wherein R represents an alkyl group containing more than 1 C atom, which comprises reacting a salicylic acid ester with phosgene and a caustic alkali in the approximate molecular proportions of 2, 1 anl 2, respectively, and in the presence of acetone.

8. The method of making a carbonate of an alkyl salicylate, having the following formula:

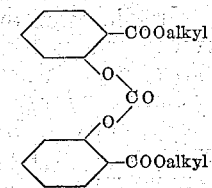

which comprises reacting an alkyl salicylate with slightly more than the equivalent proportion of phosgene and sodium hydroxide, in an acetone medium.

9. As a new product, the carbonate of normal propyl salicylate, the same forming colorless, odorless crystals, insoluble in water and only slightly soluble in alcohol, and having a melting point of 61° to 62° C.

Signed by me this 10 day of June, 1929.

ERNEST F. GRETHER.